United States Patent [19]

Levine

[11] 4,163,917
[45] Aug. 7, 1979

[54] ULTRASONIC TRANSDUCER WITH TEMPERATURE STABILITY DUE TO SELECTED DAMPING MATERIALS AND/OR ASSEMBLY METHODS

[75] Inventor: Walter E. Levine, Port Huron, Mich.

[73] Assignee: Bindicator Company, Birmingham, Mich.

[21] Appl. No.: 854,788

[22] Filed: Nov. 25, 1977

Related U.S. Application Data

[62] Division of Ser. No. 741,310, Nov. 12, 1976, Pat. No. 4,081,889, which is a division of Ser. No. 560,245, Mar. 20, 1975, Pat. No. 4,015,319.

[51] Int. Cl.² ........................................... H01L 41/10
[52] U.S. Cl. ..................... 310/327; 29/25.35; 310/312; 310/334
[58] Field of Search ............... 310/312, 321, 322, 324, 310/326, 327, 334, 346; 29/25.35

[56] References Cited

U.S. PATENT DOCUMENTS

| | | | |
|---|---|---|---|
| 3,239,696 | 3/1966 | Burkhalter et al. | 310/327 |
| 3,376,438 | 4/1968 | Colbert | 310/327 |
| 3,387,149 | 6/1968 | Young | 310/327 X |
| 3,821,834 | 7/1974 | McElroy | 310/327 X |
| 3,890,423 | 6/1975 | Zacharias, Jr. | 310/327 X |
| 4,006,371 | 2/1977 | Quirke | 310/322 |

*Primary Examiner*—Mark O. Budd
*Attorney, Agent, or Firm*—Barnes, Kisselle, Raisch & Choate

[57] ABSTRACT

An ultrasonic transducer and a method for manufacture thereof in which a piezoelectric crystal is bonded to a flat diaphragm with the neutral bending axis of the crystal/diaphragm combination being within the bonding agent. The diaphragm is then pressed into the open end of a hollow shell. The resonant frequency of the shell, diaphragm and crystal combination is determined by the extent to which the diaphragm is pressed into the shell and, in the preferred example disclosed, is set at about 19.8 KHz. The shell cavity is then filled with a mixture of RTV and a nonconductive particulate material at a weight ratio between 5/1 and 20/1. This mixture lowers the Q of the transducer while also raising its resonant frequency to the desired 20 KHz.

18 Claims, 8 Drawing Figures

ULTRASONIC TRANSDUCER WITH TEMPERATURE STABILITY DUE TO SELECTED DAMPING MATERIALS AND/OR ASSEMBLY METHODS

This is a division of application Ser. No. 741,310, filed Nov. 12, 1976 now U.S. Pat. No. 4,081,889 which was a division of application Ser. No. 560,245, filed Mar. 20, 1975, Now U.S. Pat. No. 4,015,319.

The present invention relates to distance measuring devices and, more particularly, to an ultrasonic transducer and a method for manufacture thereof which is particularly useful for measuring the level of material in a storage tank or bin.

It has heretofore been suggested that ultrasonic measuring techniques be used for monitoring or measuring the level of material in a storage tank or bin. As shown in the U.S. Pat. No. 2,943,296, of Fryklund for example, an ultrasonic transducer may be mounted to the top of the storage tank and may be directed to transmit pulses downwardly toward, and to receive echo pulses reflected upwardly from, the upper surface of a stored material, the transmitted or echo pulses traveling through the "head space" or air between the tank top and the material surface. Suitable electronic processing means, typically an analog signal processor, are provided to yield an indication of material level by measuring the round-trip transit time of a transmit/echo pulse sequence.

It is an object of the present invention to provide an ultrasonic transducer, and a method for making the same, which is both economical in manufacture and reliable in operation.

It is another object of the present invention to provide an ultrasonic transducer which can be readily tuned during manufacture to a desired resonant frequency.

It is a further object of the present invention to provide a simplified method for accurately tuning an ultrasonic transducer to a desired resonant frequency.

it is a specific object of the present invention to provide an ultrasonic transducer which is particularly suitable for use in monitoring the level of material in a storage tank or bin.

The novel features which are considered to be characteristic of the present invention are set forth in particular in the appended claims. The invention itself, however, together with additional objects, features and advantages thereof will be best understood from the following description when read in conjunction with the accompanying drawings in which:

Figure 1:
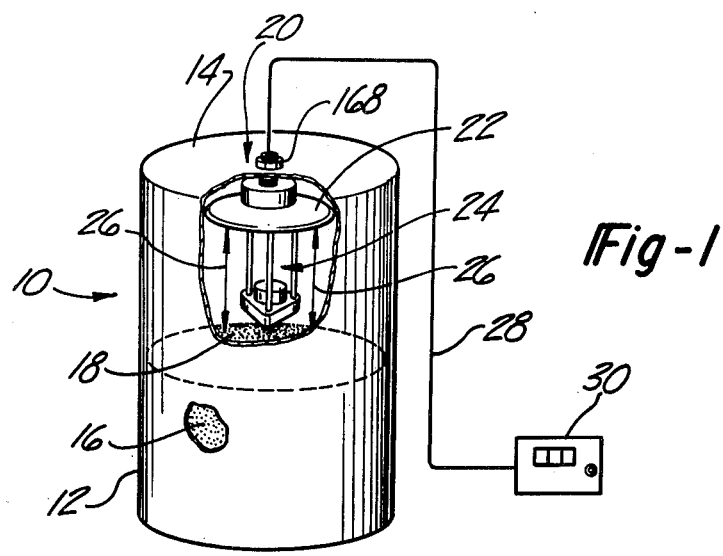
FIG. 1 is a perspective view, partially in section, of a material storage tank in which the material is monitored, the antenna provided in accordance with the present invention being shown on an enlarged scale relative to the tank.

Referring to FIG. 1, a material storage tank 10 is depicted as having a cylindrical side wall 12 and a top 14. A material 16 which may be a liquid or a solid such as grain, coal or rocks, for example, is stored in tank 10 and has an upper surface 18 which is to be monitored to provide an indication of material level. It will be understood that tank 10 may be made of any suitable material and will be provided with suitable means (not shown) for filling and draining material 16 into and from the tank.

In accordance with the present invention, a transducer antenna assembly 20 is interiorly mounted to depend from tank top 14 and comprises a parabolic reflector 22 and an ultrasonic transducer 24 mounted at the reflector focus. Reflector 22 directs or reflects ultrasonic pulses emanating upwardly from transducer 24 downwardly toward surface 18 as at 26 and, similarly, receives echo pulses reflected upwardly from surface 18, and reflects or directs the echo pulses to transducer 24, the transmitted and echo pulses traveling through the "head space" or air between tank top 14 and material surface 18. Transducer antenna assembly 20 is connected by means of a coaxial cable 28 to material level control electronics 30.

An embodiment of control electronics 30 suitable for use with the transducer antenna assembly 20 of the present application is the subject of a copending application of Ellery P. Snyder, Ser. No. 560,244, now U.S. Pat. No. 4,038,890, filed on even date herewith and assigned to the assignee hereof. Since the control electronics disclosed therein forms no part of the present invention and is not necessary for the understanding thereof, such electronics need not be further discussed. Reference is made to said copending application for a complete discussion of a suitable embodiment of control electronics 30.

Figure 2:
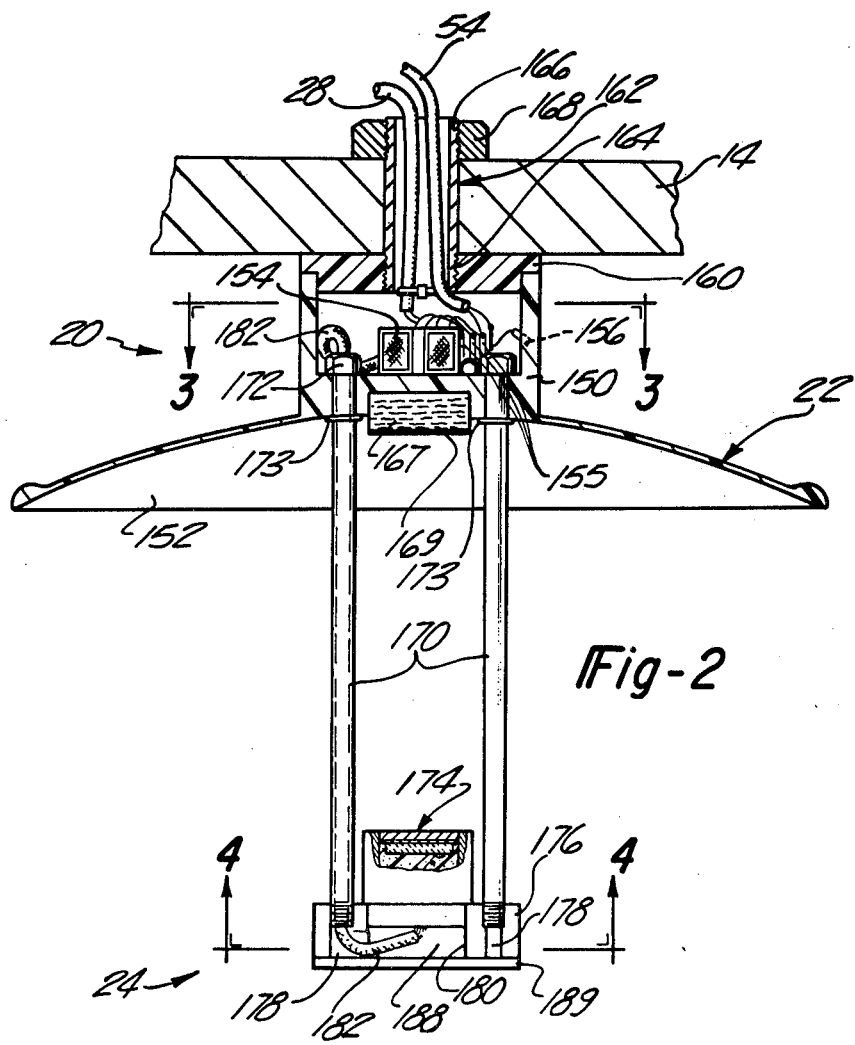
FIG. 2 is a sectional view vertically bisecting the transducer antenna assembly shown in FIG. 1.
Figure 3:
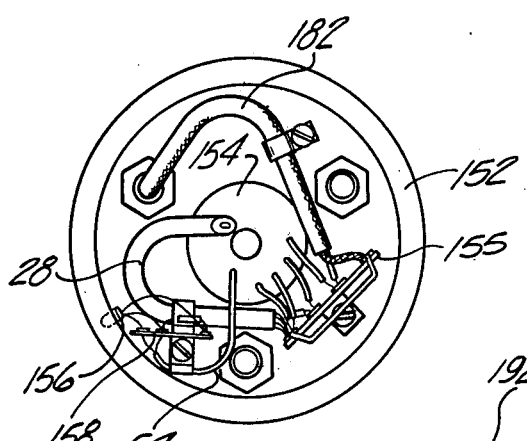
FIG. 3 is a sectional view taken along the line 3—3 of FIG. 2.
Figure 4:
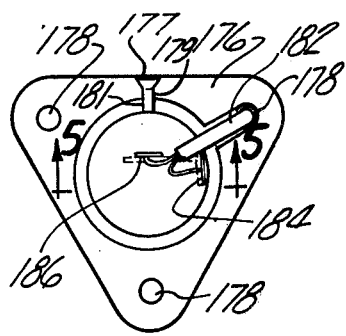
FIG. 4 is a sectional view taken along the line 4—4 of FIG. 2.

The structure of a presently preferred embodiment of transducer antenna assembly 20 is shown in detail in FIGS. 2-5 which are all drawn to scale. Referring to FIGS. 2-4, parabolic reflector 22 is molded of plastic-reinforced fiber glass and includes an integral cylindrical reflector housing 150 extending vertically from the reflector proper 152. Enclosed within housing 150 is an impedance matching pulse transformer 154 having primary and secondary windings wound upon a toroidal core of ferromagnetic material in a preferred secondary/primary winding ratio of 5/1. By thus providing the pulse transformer in the control electronics/transducer connection line, the electronics and transducer are respectively matched to the impedance of cable 28 (FIG. 1) while, at the same time, a 25/1 impedance increase between the cable line and the transducer is achieved. This results in a significant improvement in power transmission efficiency between the electronics and the transducer. Moreover, location of the pulse transformer at the transducer remotely of the control electronics allows the use of a low impedance cable to connect the control electronics to the transducer and places the high voltage circuits of the system within a protective enclosure at the transducer. Provision of the pulse transformer in the electronics/transducer connection line is a subject of the above-reference Snyder copending application.

The transformer windings are connected to a terminal strip 155, the primary winding being then connected to control electronics 30 (FIG. 1) via cable 28. A thermistor 156 which provides an indication of ambient temperature within storage tank 10 (FIG. 1) is embedded in the wall of housing 152 and is connected via a second terminal strip 158 (FIG. 3) and a cable 54 to control electronics 30. The signal thus provided to electronics 30 by thermistor 156 may be used to compensate for temperature-induced variations of the speed of ultrasonic measuring pulses through air.

A reflector housing cover 160 is press fitted over and bonded to housing 152 and receives one threaded end 164 of a transducer mounting nipple 162. Housing 152 is then filled with a suitable encapsulant such as RTV. A second threaded nipple end 166 is adapted to receive a locking nut 168 to firmly secure transducer antenna assembly 20 to tank top 14. A fiber glass acoustic absorber block 167 is centrally mounted in reflector 154 opposite transducer 24 to inhibit generation of standing waves between the transducer and the reflector. Block 167 is held in place by a screen 169. Provision of block 167 is also a subject of the above-referenced Snyder copending application.

Three parallel, hollow, nickel-plated steel or stainless steel tubes 170 are secured to reflector 22, as by nuts 172 and grip rings 173, and support ultrasonic transducer 24 at the reflector focus. A triangular mounting block 176 of plastic-reinforced fiber glass has the threaded holes 178 at respective triangle apexes to receive the respective threaded ends of support tubes 170. The open end of a transducer cup assembly 174 is axially pressed into a central bore 180 in block 176 and locked in place by a screw 177 received in aligned holes 179,181 in housing 176 and cupshell 190 respectively, hole 181 being threaded to receive the screw. A cable 182 is connected to terminal block 155 (FIG. 3) and then fed through one of the support tubes 170 (FIG. 2) to connect the secondary of transformer 154 to the cup assembly terminals 184, 186 (FIG. 4). The cavity 188 (FIG. 2) formed by cup assembly 174 and block 176 is filled with RTV encapsulant, and a cover 189 is bonded to block 176 to cover the cavity and tube holes 178.

Figure 5:
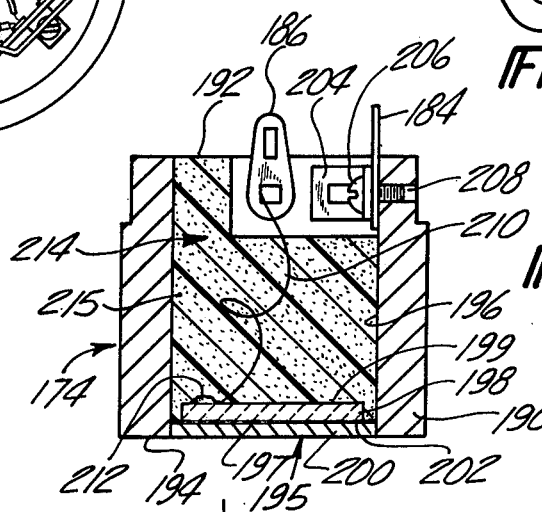
FIG. 5 is a sectional view laterally bisecting the transducer cup assembly shown in FIGS. 1, 2 and 4 but inverted relative to FIG. 2, and is taken along the line 5—5 of FIG. 4.

Referring now to FIG. 5, transducer cup assembly 174 includes a tubular casing or hollow shell 190, preferably made of aluminum and having an axial cylindrical bore 196 opening at shell ends 192,194, and a laminated composite vibratory element 195 comprising a piezoelectric crystal 198 having opposed, parallel front and back faces 197,199 adhered to a transducer face plate or diaphragm 200 preferably of aluminum by a layer 202 of bonding material. When crystal 198 is energized by control electronics 30 (FIG. 1), the crystal and diaphragm 200 form an oscillating "composite beam" which is subjected to internal bending stresses. The neutral bending axis of the crystal/diaphragm combination is preferably located in bonding layer 202, or within diaphragm 200 closely adjacent the bonding layer to insure that crystal 198 is subjected to either tensile or compressive stresses, but not simultaneously to both, thereby reducing the likelihood of crystal or diaphragm fracture, or separation of the crystal from the diaphragm. For further information regarding parameters and design criteria for constructing a composite beam so as to locate its neutral bending axis in accordance with the invention, see "Strength of Materials, Part 2, Advanced Theory and Problems", S. Timoshenko, 2nd Ed., 13th Printing, D. VanNostrand Co., Inc., New York, N.Y. as well as further details set forth hereinafter. The bonding agent is preferably conductive, such as silver-doped epoxy or silver-enriched solder. Diaphragm 200 is press fitted into end 194 of shell 190 with an interference fit, as explained in more detail hereinafter, after one or both of the interfitting peripheral surfaces have been coated with a suitable anaerobic filling agent to fill in the gaps between the diaphragm perimeter and the shell wall thus enhancing the mechanical coupling between element 195 and shell 190 by eliminating the interfacial voids therebetween.

A terminal strip 204 is mounted to shell 190 by a screw 206 received into a corresponding threaded opening 208 in the shell wall. Terminal 184 is electrically connected to screw 206, and thence to shell 190, diaphragm 200, bonding layer 202 and crystal face 194 to connect that crystal face to ground via cable 182. Terminal 186 on strip 204 is connected to back crystal face 199 via a conductor 210 and a solder joint 212.

An acoustical absorber block 214 fills the remainder of cavity 196 and is preferably comprised of a resilient synthetic material such as RTV and a nonconductive particulate material such as sand or quartz mixed in an RTV/particle ratio of 5/1 to 20/1 by weight. The particulate material, indicated in FIG. 6 as grains 215, increases the density of absorber 214, and helps break up and absorb the ultrasonic waves emanating from cyrstal back face 199. The RTV/particle mixture also lowers the Q of the transducer by adding mass to and modifying the effective spring rate of the vibratory element to which the mixture is bonded. Q is generally defined in the transducer art as the ratio of the transducer resonant frequency divided by the band width at the transducer half-power point. A Q in the range between 14 and 17 is presently preferred in material level control applications. The Q of the cup assembly without the RTV/particle absorber has been found to be generally between 70 and 90. It has also been found that, depending upon the type of RTV resin used in absorber 214, the absorber changes the resonant frequency of the transducer by either raising or lowering the resonant frequency, for example by an amount between 200 and 300 Hz. The effect of this frequency change upon the inventive construction method will be detailed hereinafter.

The preferred method of constructing transducer 24 may be outlined as follows. Crystal 198 is first bonded to diaphragm 200. Conductor 210 is then soldered to back face 199 of crystal 198 as at 212. The diaphragm is precleaned and coated with a quick-acting anaerobic adhesive penetration enhancer. The inner surface of shell bore 196 is similarly treated. The diaphragm is then placed over open end 194 of shell 190 and in coaxial alignment therewith, with the diaphragm edge resting upon the shell end. Anaerobic filler material is then applied about the periphery of the diaphragm and the inner surface of bore 196. The diaphragm is then pressed a predetermined initial distance part way into the shell, as explained hereinafter.

Figure 6:
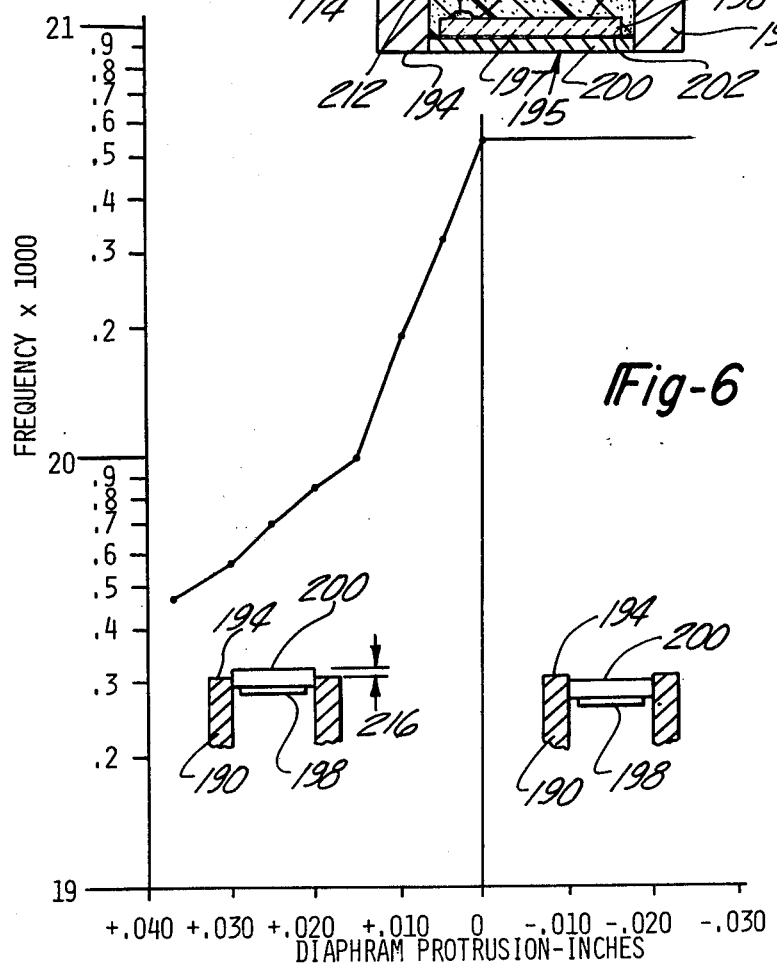
FIG. 6 is a graph depicting the resonant frequency characteristics of the transducer cup assembly shown in FIG. 5.

FIG. 6 is a graph of the resonant frequency versus diaphragm protrusion which is characteristic of one embodiment of transducer 24 using a 1.1045 inch by 0.0975 inch thick diaphragm of 2024-T4 aluminum. The crystal 198 used in plotting FIG. 6 was a 0.999 inch diameter by 0.0835 inch thick piezoelectric crystal sold by Transducer Products, Inc., of Torrington, Conn. Catalog No. LTZ-2. Bonding agent 197 was silver-doped conductive epoxy cement, Catalog No. K8-4238 sold by Hysol Division of Dexter Corporation, City of Industry, Calif. The size of shell 190 was found to be of little significance to the shape of the curve. In FIG. 6 frequency in units of KHz is plotted in log scale versus inches of diaphragm protrusion, i.e., the distance which the diaphragm extends outwardly from shell end 194, which distance is indicated at 216 in FIG. 6. It will be noted from FIG. 6 that, as diaphragm 200 is pressed into shell 190, the resonant frequency steadily increases until the outer diaphragm face is flush with shell end 194. As diaphragm 200 is pressed further into the shell beyond the flush point, the resonant frequency remains substantially constant.

Returning to the preferred method of assembling transducer 24, diaphragm 200 is pressed part way an initial predetermined distance into shell 190, for example until distance 216 equals about 0.020 inch. A variable frequency signal generator and an oscilloscope are then connected across the crystal between conductor 210 and shell 190. The generator output frequency is then varied until the point of minimum signal amplitude is found as observed on the scope, which point occurs at the resonant frequency of the assembly. Holding the assembly at a constant temperature, diaphragm 200 is then pressed further into shell 190, thereby raising the resonant frequency of the assembly, until a value $f_o$ for the empty cup assembly is achieved. This operation is preferably performed in a series of discrete steps while observing the oscilloscope output and readjusting the signal generator. Terminal strip 204 is then attached to shell 190 and conductor 210 is soldered to terminal 186.

For reasons of temperature stability, as will be detailed hereinafter in connection with FIG. 8, type 96-083 RTV marketed by Dow Corning Corp. of Midland, Mich. is the presently preferred potting compound for use in absorber 214. Absorber 214, when comprised of type 96-083 RTV has the effect of raising the resonant frequency of the potted transducer cup 174 from the initially tuned resonant frequency of the empty cup assembly $f_o$ by an amount between 200 to 300 Hz. Hence, in the example under consideration where the final desired resonant frequency is 20.0 KHz and the preferred type 96-083 RTV is to be used, a resonant frequency $f_o$ of the empty cup assembly between 19.7 to 19.8 KHz is first achieved, referring to FIG. 7, when protrusion distance 216 is between 0.022 and 0.025 inches. Type 3118 RTV marketed by Dow Corning Corp. has also been used in working embodiments of the present invention and has the effect of lowering the resonant frequency of the potted transducer cup 200 to 300 Hz. Referring again to FIG. 7 where type 3118 RTV is to be used in the example under consideration, and where the final desired resonant frequency is 20.0 KHz, the protrusion distance 216 of the empty cup is between 0.005 and 0.009 inches.

A test is then performed to determine the Q of the assembly. A microphone is placed outside of the cup adjacent diaphragm 200 at an angle of 60° to 70° to the front face of the diaphragm. The variable frequency signal generator is again activated at the predetermined resonant frequency $f_o$ and at a predetermined voltage amplitude, 20 VAC for example. The output of the microphone is then read, usually in millivolts, using a voltmeter and suitable amplifiers. The ratio of the microphone output to the crystal input is of no significance. The microphone output is then multiplied by $\sqrt{2}/2$ or about 0.707. The frequency of the signal generator is then increased until the microphone output is at this lower output value, i.e., 0.707 times the resonant microphone output voltage. This occurs at an upper frequency $f_1$. The generator frequency is then varied below the resonant frequency until the microphone output is again at 0.707 of its resonant value. This occurs at a lower frequency $f_2$. The Q for the assembly may then be determined as being equal to:

$$f_o/f_1-f_2$$

As indicated earlier, this Q will normally be above 70.

To reduce Q by loading the back face 199 of crystal 198 the RTV/particulate material mixture is now prepared. When the calculated Q of the empty cup assembly is close to 70, an RTV/particle ratio of 5/1 to 10/1 by weight provides sufficient crystal loading to achieve a desired final Q of 14 to 17. For higher values of the calculated Q, a higher RTV/particle ratio is required, a 20/1 ratio being the general maximum. This custom-calculated mixture is poured into shell end 192 until cavity 196 is substantially filled, i.e., until only terminals 184,186 remain exposed. As indicated above, the RTV/particle mixture not only drops Q to the desired level, but also modifies the resonant frequency of the assembly, i.e., raises or lowers the resonant frequency about 200 to 300 hertz depending upon the type of RTV used, to within very close limits centering on the desired resonant frequency of 20 KHz. This is assuming of course that all other parameters, such as cup volume etc., remain constant. After the RTV/particle mixture has cured, the assembly is dipped into a suitable coating compound such that aluminum diaphragm 200 and shell 190 are protected against corrosion. Alternatively and preferably, shell 190 and diaphragm 200 may be precoated before the assembly process such that the above-described tuning process adjusts for variations in coating thickness. Transducer cup assembly 174 is then complete and ready to be pressed into block 176 and mounted to reflector 22 as shown in FIGS. 2-4.

In order to perform the above-described tuning method of the invention to best advantage from the standpoint of wear and tear on the vibratory element of the transducer, it is preferred to provide a laminated composite vibratory element 195 of circular outline wherein the piezoelectric element in the form of a piezoceramic crystal 198 comprises the innermost member of the vibratory element backed up by the RTV/particle mass 215, and the outermost member is the metal diaphragm 200 so that the same provides protection and sealing to the transducer interior components and particularly the crystal. The diameter of diaphragm 200 is made larger than that of crystal 198 so that the metal edge of the diaphragm is the only portion of the vibratory element which directly engages the inner wall of transducer shell 190 during the interference fit engagement tuning and mounted method of the invention. Given this preferred configuration, pursuant to another feature of the present invention, the diameter and thickness of the crystal are correlated with the diameter and thickness of the diaphragm such that, taking into consideration the parameters of the modulus of elasticity of the crystal and diaphragm materials, the volume of these components, the spring rate and mass of these components, the desired operating frequency of the transducer, and radiating power and efficiency factors, vibratory element 195 is preferably designed as a composite beam having the nodal points of its first mode of bending (vibration along the major axis of assembly induced by energization of the crystal) occurring at the periphery of the diaphragm or closely adjacent thereto to thereby reduce stresses on the crystal during transducer operation. This location of the nodal points also cooperates with the described adjustable interference fit tuning procedure by rendering the resonant frequency of the composite beam sensitive to the extent of mechanical coupling between the periphery of the diaphragm and the interengaged wall of the transducer shell.

The aforementioned factors are also taken into consideration in selecting the correlated dimensions of crystal 198 and diaphragm 200 such that the neutral bending axis of the composite beam is shifted out of the crystal and lies either within or closely adjacent to the bonding material intermediate the crystal and diaphragm. This location of the neutral axis of the vibratory element insures that the crystal, during flexure thereof in response to applied voltage, is not subjected to simultaneous application of tensile and compressive stresses. Thus, when composite vibratory element 195 flexes upwardly or into shell 190 from its normal flat quiescent condition, crystal 198 is subjected entirely to tensile stresses. Likewise, during the excursion of element 195 from the flat condition outwardly from shell 190, the crystal is subjected only to compressive stresses. Due to this mode of operation, the crystal is less likely to be damaged by the vibratory stresses induced by the piezoelectric loading of the beam. In a specific example constructed pursuant to the above considerations, optimum results were obtained with piezoceramic crystal having a diameter of 1.100 inches and a thickness of 0.080 inch and with an aluminum diaphragm having a diameter of 1.105 inches and a thickness of 0.08255 inch. In another embodiment of the same general configuration, acceptable results were achieved using a piezoceramic crystal having a 1.00 inch diameter and a thickness of 0.080 to 0.082 inch in conjunction with a 1.105 inch diameter aluminum diaphragm having a thickness range of 0.0968 to 0.097 inch.

Although the above-described results, i.e., elimination of stress reversals in the crystal, may also be obtained by further shifting the neutral bending axis of the composite element into the diaphragm, it is to be understood that in doing so the magnitude of the stresses imposed on the crystal will increase in proportion to the distance of the neutral axis from the crystal. In addition, a design in which the neutral bending axis is disposed within the diaphragm to any substantial extent may result in an increase in cost of materials due to the attendant increase in thickness of the diaphragm. Therefore, the neutral axis is, in an optimum configuration, located in the layer of bonding material between the crystal and diaphragm, although location of the axis within the diaphragm closely adjacent the bonding layer will also provide most of the improved results discussed above.

It is also to be understood that the variable insertion tuning procedure provided by the present invention may be applied to vibratory elements of differing structure and configuration from that shown at 195 of FIG. 5. For example, the vibratory element may consist of just one beam member in the form of a piezoelectric crystal adapted either to directly engage the wall of the transducer shell or having suitable metallic edge encapsulation structure to protect the crystal during the insertion and interference mounting of the same into the shell. Also, although less preferably, it is possible to achieve the tuning effect of the method by other means of varying the extent of mechanical coupling between the periphery of the diaphragm and the cooperating housing support structure therefor. For example, the crystal may be inserted with a clearance fit into a metal shell to a predetermined location therein and then the wall of the shell cold worked or otherwise formed in discrete steps so as to engage the diaphragm periphery with a stress fit and thereby gradually increase the axial extent of the contact between the periphery of the diaphragm and the shell wall until the mechanical coupling therebetween provides the desired operating frequency of the vibratory element. However, the adjustable insertion interference fit procedure described previously is preferred from the standpoint of ease of assembly and simplification of fixtures and tooling required.

It is to be further understood that the preferred orientation of the crystal/diaphragm plate in the transducer application disclosed herein is with the crystal disposed interiorly of the shell relative to the diaphragm for the aforementioned protection features as well as to facilitate and protect electrical connections to the crystal. However, the tuning method can also be practiced with the orientation of the plate reversed; i.e., with the crystal disposed as the outermost member of the beam relative to the shell, particularly in those applications where the protection factors do not apply.

In the embodiments disclosed above, the mounting of the crystal to the diaphragm by bonding techniques is preferred from the standpoint of manufacturing ease. However, other methods and structures for mounting the crystal to the diaphragm may also be employed, preferably those which obtain direct face-to-face contact between the crystal and diaphragm in order to avoid loss of energy through the interposed bonding material. For example, mounting by means of a suitable mechanical fastening element, as is well understood in the art, may be employed without negating the advantages of the tuning procedure of the invention as well as those advantages attributable to the specific crystal/diaphragm beam geometry described above. However, such mechanically fastened composite vibratory elements require close control of part tolerances and assembly stresses. Therefore, the aforementioned bonding techniques represent the presently preferred mode of constructing the crystal/diaphragm vibratory element.

Figure 7:
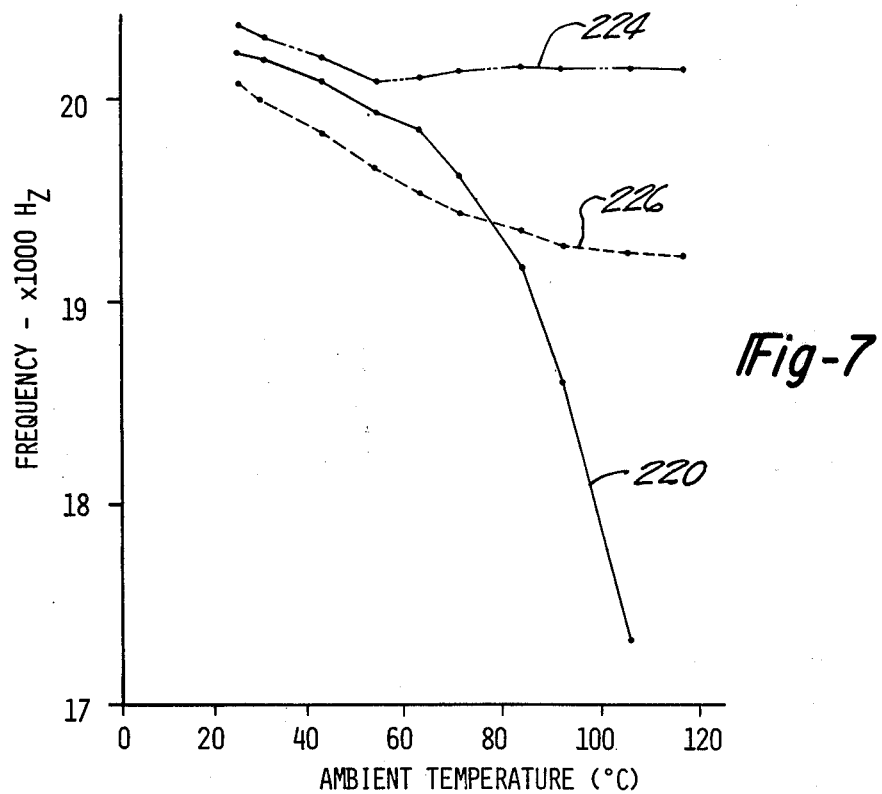
FIGS. 7 and 8 are composite graphs depicting the resonant frequency v. temperature characteristics of various transducer cup assemblies constructed in accordance with the invention.

It has also been found in connection with the preferred embodiments described that the material used in bonding layer 202 as well as the degree of interference between diaphragm 200 and shell 190 each have an effect upon the temperature characteristics of the overall transducer cup assembly 174. FIG. 7 is a composite graph showing the temperature characteristics of three differently constructed embodiments of the transducer cup assembly prior to insertion of absorber 214. In FIG. 7, resonant frequency in KHz is plotted in linear scale versus ambient temperature in degrees centigrade (°C.). Addition of absorber 214 to the cup assembly will lower the respective curves of FIG. 7 but will otherwise have no effect on the depicted characteristics.

Referring to FIG. 7, curve 220 indicates the frequency versus temperature response of an empty transducer cup assembly in which a 1.1045 inch diameter diaphragm is fully pressed, i.e., to the flush point at which distance 216 (FIG. 5) is equal to zero, into a shell having a 1.1017 inch diameter bore. Thus, the amount of interference in the embodiment depicted at 220 is 0.0028 inches. In the embodiment depicted at 220 the piezoceramic crystal was bonded to the diaphragm by silver-loaded epoxy as set forth above in connection with FIG. 6.

Curve 224 of FIG. 7 indicates the temperature characteristics of an empty transducer cup in which a 1.1057 inch diameter diaphragm is pressed into a 1.1022 inch shell bore, the amount of interference thus being equal to 0.0035 inch. Similarly, curve 226 depicts the characteristics of a 1.1057 inch diameter diaphragm pressed into a 1.1025 inch diameter shell bore, the diaphragm/shell interference thus being equal to 0.0032 inch. In the embodiments depicted at 224 and 226 the respective crystals were bonded to the diaphragms by silver-enriched (SN62) solder rather than by conductive epoxy. It will be noted firstly with respect to curves 224, 226 that use of silver-enriched solder rather than epoxy as a bonding agent has a marked effect upon transducer temperature response, tending to flatten the response curve and making the transducer resonant frequency more stable over an extended temperature range. It will also be noted that the greater degree of interference fit in the embodiment of 224 as opposed to that of 226 has a further increased flattening effect upon the response curve, yielding a curve at 224 which is substantially flat over an ambient temperature range of almost 100° C. As a design criteria, it has been found that the maximum amount of interference between the diaphragm and shell wall, approaching the point at which the parts will be cold welded, but without causing permanent deformation of either the diaphragm or the shell, is desirable.

It has also been found, in accordance with the present invention, that the temperature range over which the transducer will effectively operate and the stability of the transducer at any given temperature are significantly enhanced when absorber 214 is heated under particularly selected time and temperature conditions to cause the entire mass of liquid RTV to cure within cup assembly 174 at a temperature above the maximum ambient temperature in which the transducer is expected to operate. It is believed that this phenomenon is due, at least in part, to the fact that the RTV rubber compound, when cured, is internally, substantially stress-free at the cure temperature. Any increase in transducer operating temperature above the cure temperature causes the previously cured compound to expand, placing a pressure on the back face of the crystal, and thereby lowering the resonant frequency of the potted cup assembly. Conversely, any decrease in temperature below the cure temperature causes the cured RTV compound to contract, thereby reducing the pressure on the back face of the crystal. It has been found that the effect upon transducer resonant frequency due to ambient temperature changes is less significant below the cure temperature of the compound than above that temperature. This phenomenon is exemplified in FIG. 8 which is a composite graph depicting the resonant frequency v. temperature characteristics of two potted transducers having different RTV potting compounds and different effective cure temperatures. In FIG. 8 resonant frequency in KHz is plotted against temperature in degrees centigrade (°C.), both in linear scale.

Figure 8:
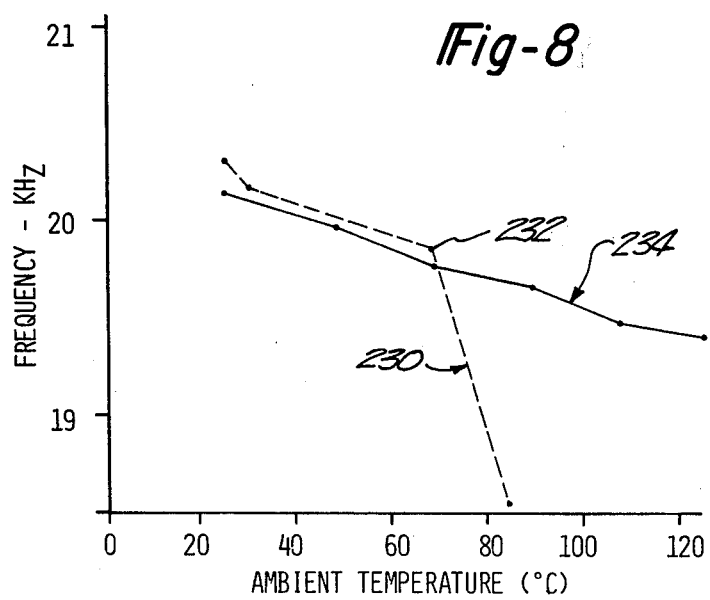

In FIG. 8 curve 230 depicts the resonant frequency v. temperature characteristics of a potted transducer cup 174 (FIG. 5) having a 1.1039 inch diameter diaphragm pressed into a 1.1018 inch diameter shell bore, the assembly being then potted with Dow Corning type 3118 RTV. The percentage, by weight, of particulate material 215 (FIG. 5) in absorber 214 may shift the curves of FIG. 8 upwardly or downwardly in that FIG., but has no effect upon the slope of the curves and, for that reason, will not be discussed further in connection with FIG. 8. A family of curves for differing particulate weight ratios may be readily developed by persons skilled in the art for each type of RTV compound under consideration. The transducer cup assembly exemplified at 230, including the shell, vibratory element and liquid RTV absorber, were placed for one hour in an oven preheated to 125° C. However, the "trigger" temperature of type 3118 RTV, i.e., the minimum ambient temperature at which the RTV cures, is significantly below 125° C. allowing a portion of the compound to cure before reaching oven temperature. Thus, curve 230 has a substantially uniform slope between room temperature (25° C.) and about 70° C., above which temperature the curve drops rapidly at a rate of over 160 Hz/°C. The sharp "knee" 232 of curve 230 indicates that the RTV compound had an effective cure temperature of about 70° C.

Curve 234 of FIG. 8 depicts the resonant frequency v. temperature characteristic of a transducer having a 1.1047 inch diameter diaphragm pressed into a 1.1016 inch shell bore, the assembly being then potted using Dow Corning type 96-083 RTV. The assembly, including liquid RTV, was again placed for one hour into an oven preheated to 125° C. However, the trigger temperature of type 96-083 RTV is near 125° C. so that the entire compound effectively cured at that temperature. Thus, curve 234 has a substantially uniform slope of about 8 Hz/°C. over an operating ambient temperature range of 25° to 125° C.

From the foregoing description in connection with FIGS. 6 and 8, it will be appreciated that, where the ambient operating temperature of the transducer is known in advance, the transducer may be turned at the assembly stage to a desired resonant frequency. For example, where it is known that a particular transducer will be operating in an atmosphere having an ambient temperature of 80° C. and is to have a resonant frequency of 20.0 KHz, curve 234 of FIG. 8, or one similar thereto but plotted for the particular diaphragm and bore diameter to be used, is first referenced to yield the desired resonant frequency at room temperature (25° C.). From this value, 250 Hz (i.e., between 200 and 300 Hz) is subtracted to yield the room temperature resonant frequency of the transducer cup without the absorber block (using type 96-083 RTV). Then FIG. 6, or a curve similar to FIG. 6 but plotted for the particular diaphragm and shell to be used, is referenced to determine the diaphragm protrusion needed to achieve the desired room temperature resonant frequency of the empty cup. Assembly of the transducer may then proceed according to the method described above. It will be recognized, of course, that, where the maximum operating temperature of the transducer is to be below the 70° C. effective cure temperature of the transducer exemplified at curve 230, that transducer, including type 3118 RTV, will operate satisfactorily.

It will also be appreciated that the preferred assembly procedure described in connection with FIG. 6 is substantially reversible, i.e., if diaphragm 200 is pressed too far into shell 190, it may be pressed back out of the shell to reduce the mechanical coupling between the diaphragm and shell wall, either in step-wise fashion to achieve the desired resonant frequency by "walking" back down the curve of FIG. 6, or by removing the diaphragm completely from the shell and starting over as described.

From the foregoing description, it will now be apparent that the ultrasonic transducer and method for manufacture thereof provided by the present invention fully satisfy all of the objects, features and advantages as set forth above. While the transducer structure and manufacturing method have been disclosed in conjunction with a particular presently preferred embodiment thereof, it will be apparent that many alternatives, modifications and variations will suggest themselves to persons skilled in the art in view of the foregoing description. Accordingly, the present invention is intended to embrace all such alternatives, modifications and variations as fall within the spirit and broad scope of the appended claims.

The invention claimed is:

1. A transducer having a preselected resonant frequency comprising an open hollow shell and a vibratory element having an element peripheral thickness and including a piezoelectric crystal, said element being received axially into an open end of said shell by interference press-fit to a depth in said shell less than said peripheral thickness, said preselected resonant frequency being a function of said depth of interference press-fit.

2. The transducer set forth in claim 1 wherein said shell is cylindrical in shape, and wherein said vibratory element is circular in shape axially of said shell, said vibratory element operating in the first bending mode at said preselected resonant frequency with the nodal point of said first bending mode being located at the periphery of said element.

3. The transducer set forth in claim 1 wherein said vibratory element comprises said piezoelectric crystal, a flat circular diaphragm and means bonding said crystal to said diaphragm along opposing crystal and diaphragm surfaces.

4. The transducer set forth in claim 3 wherein the neutral bending axis of said vibratory element lies within said bonding means or within said diaphragm closely adjacent said bonding means.

5. The transducer set forth in claim 4 wherein said diaphragm has a diameter which is greater than that of said crystal, the periphery of said diaphragm being mechanically coupled to said shell by said interference press-fit.

6. The transducer set forth in claim 3 wherein said crystal is located interiorly of said shell, and wherein said transducer further comprises acoustic damping means coupled to a face of said crystal remote from said diaphragm.

7. The transducer set forth in claim 16 wherein said damping means comprises RTV mixed with a nonconductive particulate material.

8. The transducer set forth in claim 7 wherein said RTV and said particulate material are mixed in an RTV/particle ratio of 5/1 to 20/1 by weight.

9. The transducer set forth in claim 3 wherein said bonding means is electrically conductive.

10. The transducer set forth in claim 9 wherein said bonding means comprises silver-enriched solder.

11. The transducer set forth in claim 7 for use in an environment having a maximum ambient temperature, said RTV comprising a cured rubber mass having an effective cure temperature which is greater than said maximum ambient temperature.

12. In the method of constructing an ultrasonic transducer to possess a preselected maximum operating temperature above room temperature and comprising a vibratory element including a piezoelectric crystal and acoustic damping means including a silicone rubber compound operatively coupled to said vibratory element, the improvement comprising the step of stabilizing variations in transducer resonant frequency as a function of operating temperature up to said maximum operating temperature by selecting for said damping means a silicone rubber compound possessing a trigger temperature above said maximum operating temperature and then causing said damping means to be cured at said trigger temperature above said maximum operating temperature.

13. In an transducer for use in an environment having a maximum operating temperature including a piezoelectric vibratory element and an acoustic absorber comprising a silicone rubber compound operatively coupled to said element, the improvement wherein the effective cure temperature of said acoustic absorber is above said maximum operating temperature.

14. The transducer set forth in claim 13 wherein the cure trigger temperature of said silicone rubber compound is above said maximum operating temperature.

15. An ultransonic transducer comprising a hollow shell and a vibratory element including a piezoelectric crystal mechanically coupled to said shell, and acoustic damping means coupled to said vibratory element comprising a mixture of a silicone rubber compound and a nonconductive particulate material in a predetermined weight ratio in the range of 5/1 to 20/1 rubber/particulate-material by weight.

16. The ultrasonic transducer set forth in claim 15 adapted for use in an environment having a maximum operating temperature wherein said accoustic damping means including said silicone rubber compound has an effective cure temperature which is above said maximum operating temperature.

17. In the method of constructing an ultrasonic transducer which includes a shell and a vibratory element carried at one end of said shell and comprising a piezoelectric crystal bonded to a diaphragm, the improvement comprising the step of stabilizing variations in transducer resonant frequency as a function of operating temperature of said transducer by bonding said crystal to said diaphragm with silver-enriched solder.

18. The method set forth in claim 17 wherein said diaphragm is structurally separate from said shell and said method comprises the additional step of inserting said diaphragm into an open end of said shell by interference press fit.

* * * * *